3,551,294
ERYTHROMYCIN PROCESS
James C. French, St. Clair Shores, John D. Howells, Grosse Pointe Woods, and Lucia E. Anderson, Harper Woods, Mich., assignors to Parke, Davis & Company, Detroit, Mich., a corporation of Michigan
No Drawing. Continuation of application Ser. No. 698,153, Jan. 16, 1968. This application May 15, 1968, Ser. No. 729,391
Int. Cl. C12d 9/20
U.S. Cl. 195—96     6 Claims

ABSTRACT OF THE DISCLOSURE

Process for producing the antibiotic erythromycin by cultivating an erythromycin-producing microorganism of the genus Arthrobacter in an aqueous nutrient medium containing sources of assimilable carbon and nitrogen. The process produces a good yield of erythromycin (erythromycin A) without significant coproduction of closely related antibiotics.

CROSS-REFERENCE TO RELATED APPLICATION

This is a continuation of our copending application Ser. No. 698,153, filed Jan. 16, 1968, now abandoned.

SUMMARY AND DETAILED DESCRIPTION

The present invention relates to a process for producing the antibiotic erythromycin. More particularly, it relates to a process for producing erythromycin by cultivating an erythromycin-producing microorganism of the genus Arthrobacter under artificial conditions in a suitable nutrient medium.

The organism (a bacterium) employed in the process of the invention can be isolated from soil samples by standard isolation techniques. This organism has been isolated from a sample of soil collected from Lajas Valley, near Cabo Rojo Village, Puerto Rico. Cultures of this organism have been deposited with the United States Department of Agriculture, Northern Utilization Research and Development Division, Peoria, Illinois, and are being maintained in their permanent culture collection under the identification number NRRL B–3381.

As used herein, the designation Arthrobacter sp. NRRL B–3381 refers to a strain of Arthrobacter having the characteristics described below and is not limited to a specific culture of the organism such as may be found in a particular culture collection.

The media and methods used for the description of the organism are from Society of American Bacteriologists, Manual of Microbiological Methods (1957) and Smith, Gordon and Clark. Agricultural Monograph 16, U.S. Department of Agriculture (1952). With respect to the description of the organism, the incubation temperature is 28° C. unless otherwise noted.

The organism is without chlorophyll, unicellular, aerobic, saprophytic, pleomorphic, and without endospores. In young cultures, the cells appear as rods which vary in size (0.3 to 1.0 micron x 1.0 to 6.0 microns) and shape (from straight to bent, curved, swollen or club-shaped). Angular arrangements of the cells commonly occur. Young cells occasionally form rudimentary branches. In older cultures (after one or more days) coccoid cells (0.3 to 1.0 micron) are usually observed.

The above characteristics closely conform with those of the genus Arthrobacter as described in Bergey's Manual of Determinative Bacteriology, seventh edition (1957), pages 605 and 606. It is, therefore, concluded that the organism belongs in this genus. The organism is referred to herein by the designation Arthrobacter sp. NRRL B–3381.

Other characteristics by which Arthrobacter sp. NRRL B–3381 can be recognized are found in Table I.

TABLE I

Characteristics of Arthrobacter sp. NRRL B–3381

| | |
|---|---|
| Motility | Nonmotile. |
| Gram stain | Positive. |
| Acid-fast stain | Negative. |
| Growth temperature: | |
|   28° C. | Moderate to abundant. |
|   37° C. | Do. |
|   45° C. | None. |
| Growth characteristics in nutrient broth: | |
|   Surface | Membranous. |
|   Subsurface | Turbid. |
|   Amount | Abundant. |
|   Sediment | White to light yellow. |
| Colony characteristics on nutrient agar: | |
|   Form | Circular. |
|   Elevation | Raised to umbonate. |
|   Margin | Entire, slightly undulate. |
|   Surface | Smooth. |
|   Density | Translucent. |
|   Color | Yellow. |
|   Size | 1.0 to 3.5 mm. |
|   Consistency | Butyrous. |
| Colony characteristics on glycerol asparagine agar: | |
|   Form | Irregular. |
|   Elevation | Flat to umbonate. |
|   Margin | Undulate and lobate. |
|   Surface | Slightly contoured. |
|   Density | Translucent. |
|   Color | Colorless. |
|   Size | 0.5 to 1.5 mm. |
|   Consistency | Butyrous. |
| Gelatin hydrolysis in nutrient agar plus 0.4% gelatin | Positive. |
| Casein hydrolysis in skim milk agar | Do. |
| Casein hydrolysis in litmus milk | Peptonization, basic. |
| Indole production | Negative. |
| Acetyl-methyl-carbinol production | Do. |
| Reduction of nitrate to nitrite | Do. |
| Starch hydrolysis | Do. |
| Cellulose decomposition | Do. |
| Citrate utilization | Do. |
| Survival at 72° C. for 15 minutes in skim milk | Do. |
| Gas production in glucose broth | Do. |
| Hydrogen sulfide production | Do. |
| Growth on synthetic agar with nitrate or ammonium salt | None to scanty. |

TABLE I.—Continued

Acid production on various carbon sources in basal medium of Ayers, Rupp, and Johnson (1919) plus 0.02% yeast extract:

| | |
|---|---|
| Adonitol | 0. |
| L-Arabinose | +. |
| Cellobiose | 0. |
| Cellulose | 0. |
| Dextrin | 0. |
| D-Fructose | +. |
| D-Galactose | +. |
| D-Glucose | +. |
| Glycerol | +. |
| i-Inositol | +. |
| Inulin | 0. |
| Lactose | 0. |
| Maltose | 0. |
| D-Mannitol | 0. |
| D-Mannose | +. |
| Melezitose | 0. |
| Melibiose | 0. |
| Raffinose | 0. |
| Rhamnose | 0. |
| Ribose | 0. |
| Salicin | 0. |
| D-Sorbitol | 0. |
| Sucrose | +. |
| Tehalose | +. |
| D-Xylose | +. |

In accordance with the invention, erythromycin is produced by inoculating an aqueous nutrient medium containing sources of assimilable carbon and nitrogen with Arthrobacter sp. NRRL B-3381 and incubating the inoculated medium at a temperature between about 20 to 40° C. under aerobic conditions. According to the usual method of operation, the aqueous nutrient medium is sterilized prior to inoculation and the incubation of the inoculated medium is carried out under aseptic, aerobic conditions until substantial antibacterial activity has been imparted to the fermentation mixture following which erythromycin is isolated in free base or acid-addition salt form by further treatment of the fermentation mixture. The preferred conditions for carrying out the fermentation are a temperature between 27 and 34° C. and a pH between 6.0 and 8.5, especially about 7.5.

As indicated above, suitable aqueous nutrient media are those containing sources of assimilable carbon and nitrogen. Sources of carbon which are assimilable and satisfactory for use include pure carbohydrates and polyhydric alcohols which can be utilized by the organism, as well as commercially-available carbohydrate mixtures. Some examples of materials which are suitable for this purpose are glucose, mannose, modified starches, corn syrup, and glycerol. The quantity of the carbohydrate or polyhydric alcohol present in the nutrient medium is not particularly critical and commonly varies from about 0.5 to 5% by weight of the medium. Quantities somewhat outside of this range can also be used.

The sources of nitrogen in the nutrient medium can be of an organic, inorganic, or mixed organic-inorganic nature. Some examples of the many nitrogenous substances which can be employed are amino acids, peptones, protein digests, corn steep liquor, soybean meal, peanut meal, cottonseed meal, ammonium salts, inorganic nitrates, and urea. Due to the crude nature of many of the readily-available nitrogen sources, the quantity to be added to the medium varies according to the purity and it is not readily possible to specify a definite quantity of nitrogenous source material which should be added to the medium. However, the nitrogenous source materials usually do not exceed 5 to 6% by weight of the total fermentation medium and in most cases they are present in a lower amount.

The presence of small amounts of auxiliary growth factors in the fermentation medium is also desirable. Some of those factors are already present in the ordinary crude organic nitrogen sources and need not be added separately. Alternatively, small amounts of such materials as yeast, yeast extracts, and distiller's solubles; inorganic salts such as sodium chloride, potassium phosphate, and magnesium sulfate; and salts of trace metals such as zinc, copper, manganese, iron and cobalt, can be added to the fermentation mixture.

The aqueous nutrient medium prepared as indicated above is, if necessary, adjusted to a pH between about 6.0 and 8.5, preferably about 7.5. A buffering agent can also be added to maintain the pH within the desired limits as the fermentation proceeds. An anti-foaming agent can also be added as required.

The cultivation of Arthrobacter sp. NRRL B-3381 in the aqueous nutrient medium can be carried out in a number of different ways. For example, the organism can be cultivated under aerobic conditions on the surface of the medium; or it can be cultivated beneath the surface of the medium, that is in the submerged condition, provided that an adequate supply of oxygen is furnished.

The preferred method for producing erythromycin according to this invention is by the fermentation of Arthobacter sp. NRRL B-3381 in a submerged or deep culture, using as inoculum a growing, 24- to 48-hour old, aerated and agitated broth culture of the organism. According to this method, a sterile aqueous nutrient medium is inoculated with the organism and incubated with agitation and aeration at a temperature between about 20 and 40° C., preferably in the neighborhood of 27-34° C., until a high concentration of erythromycin is present in the culture liquid. The length of time required for the maximum yield varies with the size and type of equipment used, the rates of agitation and aeration, and other factors. In large scale fermentations carried out in tank-type fermentors, maximum production is usually reached in about 3 to 6 days.

The quantity of erythromycin present in the broth after the fermentation period or at any time during the fermentation period can be determined by bioassay. The antibacterial activity (representing erythromycin content) of the broth is determined by measuring the inhibition in the growth of the microorganism, Sarcina lutea on a test tray, and comparing the result with the inhibition caused by an appropriate dilution of a reference sample of pure erythromycin.

At the completion of the fermentation period, erythromycin can be obtained from the broth in any of a number of ways. For example, the fermentation broth is filtered or centrifuged to remove solids. The clarified broth at approximately pH 7 is treated with 1% weight/volume of activated carbon whereby the erythromycin is adsorbed on the carbon. The carbon is eluted with aqueous acetone, preferably under slightly acidic conditions, and the eluate is neutralized, concentrated in vacuo to a small volume, adjusted to pH 9, and extracted with an organic solvent such as ethyl acetate. The ethyl acetate extract is concentrated to dryness to give a residue of erythromycin. Alternatively, the fermentation broth is clarified by filtration or centrifugation, adjusted to pH 9, and extracted with an organic solvent such as ethyl acetate. At this pH, the erythromycin goes into the organic phase. It is returned to an aqueous phase by extracting the organic phase with water maintained at pH 5. The aqueous phase is then separated, adjusted to pH 9, and again extracted with an organic solvent such as ethyl acetate. Concentration of this organic phase to dryness yields erythromycin. The product can be purified by crystallization from chloroform or from aqueous acetone or by any of the other methods known in the art. The product can also be converted into any desired acid-addition salt by reaction with any of a variety of organic or inorganic acids according to known procedures.

The process of the invention is useful as a new method for producing the antibiotic erythromycin in either free base or acid-addition salt form. A particular advantage of the process of this invention is that it produces a fermentation broth from which erythromycin (sometimes called erythromycin A) can be isolated in high yield; and that no other closely related antibiotic such as erythromycin B or erythromycin C can be detected either in the fermentation broth or in the crude product isolated from the fermentation broth. When erythromycin is produced according to the known method by fermentation of *Streptomyces erythreus* (see U.S. Pat. 2,653,899; see also U.S. Pat. 2,833,696), the production of erythromycin is accompanied by coproduction of erythromycin B and erthromycin C unless the fermentation is carried out under carefully controlled conditions. In addition, the product initially isolated from the fermentation broth can be an erythromycin complex requiring separation of the components.

The invention is illustrated by the following example.

EXAMPLE

Slant cultures of Arthrobacter sp. NRRL B–3381 are prepared on a medium having the following composition.

|  | G. |
|---|---|
| Peptone derived from casin by pancreatic digestion | 15 |
| Papacid digest of soya meal | 5 |
| Sodium chloride | 5 |
| Agar | 15 |

Distilled water, 1 liter.

The slant cultures prepared on this medium are used for inoculation purposes as described below.

A nutrient medium having the following composition is prepared.

|  | Percent |
|---|---|
| Glycerol | 2.0 |
| Soybean meal, 44% protein (solvent extracted) | 1.0 |
| Animal peptone | 0.5 |
| Ammonium chloride | 0.2 |
| Sodium chloride | 0.5 |
| Calcium carbonate | 0.25 |

Water to make 100%.

The pH of the medium is adjusted to 7.5 with 10 N sodium hydroxide prior to addition of the calcium carbonate.

Twelve liters of the medium is placed in a 30-liter stainless steel fermentor. The medium is sterilized by heating at 121° C. for 90 minutes, allowed to cool, and inoculated with a suspension of Arthrobacter sp. NRRL B–3381 cells from 3-day old slant cultures prepared as described above. The inoculated medium is incubated at 30–31° C. for 39 hours while being stirred at 200 revolutions per minute and aerated with sterile air supplied at the rate of 12 liters per minute. About 34 g. of a mixture of lard and mineral oils with mono- and diglycerides is added in portions during this time to prevent excessive foaming.

Sixteen liters of a nutrient medium having the composition described above is placed in each of two 30-liter stainless steel fermentors. Each fermentor is sterilized by heating at 121° C. for 90 minutes, allowed to cool, and inoculated with 800 ml. of the 39-hour old culture described above. The fermentation is allowed to proceed for 96 hours at 29–31° C. with constant agitation, and aeration at a rate of 16 liters of air per minute. Portions of a mixture of lard and mineral oils with mono- and diglycerides are added as required to control foaming.

After the 96-hour fermentation period, the broth is clarified by filtration using diatomaceous earth. A material such as Celite 545 can be used. Microbiological assay against *Sarcina lutea* using pure erythromycin as a standard shows that the filtered broth contains 220 to 230 micrograms/ml. of erythromycin activity.

For isolation of the product, 20 liters of the filtered broth is adjusted to pH 9.2 and extracted with an equal volume of ethyl acetate. The organic extract is concentrated under reduced pressure to a residual oil which is then partitioned between 3000 ml. of 0.2 M pH 5 phospate buffer and 1000 ml. of diethyl ether. After the two phases are equilibrated, additional phosphoric acid is added to maintain the aqueous phase at pH 5.0. The two phases are again equilibrated and the aqueous phase extracted twice more with 700 ml. portions of ether. The aqueous phase (which, at this pH, contains the erythromycin) is adjusted to pH 9.3 and extracted three times with one-third volume portions of ether. The ether extracts are combined, dried over anhydrous sodium sulfate, and concentrated in vacuo to give a residue of erythromycin; M.P. 132–138° C. following crystallization from chloroform. Two crystalline crops, totalling 3.76 g., are collected. The infrared spectra of both crops are indistinguishable from the infrared spectrum of authentic erythromycin. Thin layer and paper chromatography of both crops show only the presence of erythromycin; no erythromycin B or erythromycin C can be detected. The biological potency is approximately 1000 micrograms of erythromycin per mg. The identity of the product is further established by detailed physicochemical comparison with authentic erythromycin.

We claim:
1. Process for the production of erythromycin which comprises inoculating an aqueous nutrient medium containing sources of assimilable carbon and nitrogen with Arthrobacter sp. NRRL B–3381 and incubating the inoculated medium at a temperature from about 20 to 40° C. under aerobic conditions.
2. Process according to claim 1 wherein the aqueous nutrient medium contains added inorganic salt.
3. Process according to claim 1 wherein the inoculated medium has a pH between 6.0 and 8.5 and is incubated at a temperature between 27 and 34° C.
4. Process according to claim 1 wherein the inoculated medium is incubated for a period of 3 to 6 days.
5. Process according to claim 1 wherein the erythromycin is isolated as the free base.
6. Process according to claim 1 wherein the erythromycin is isolated as an acid-addition salt.

References Cited

Rose et al.: Biochemistry of Industrial Microorganisms, 1963, pp. 281–284.

LIONEL M. SHAPIRO, Primary Examiner